Feb. 25, 1930.                J. R. SKOVERSKI                 1,748,249
                                BORING MACHINE
                              Filed June 18, 1928
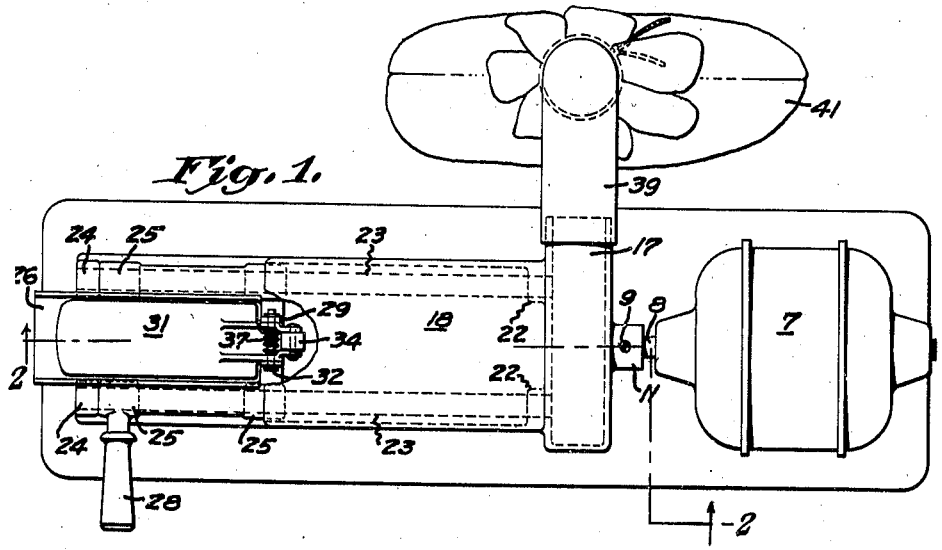
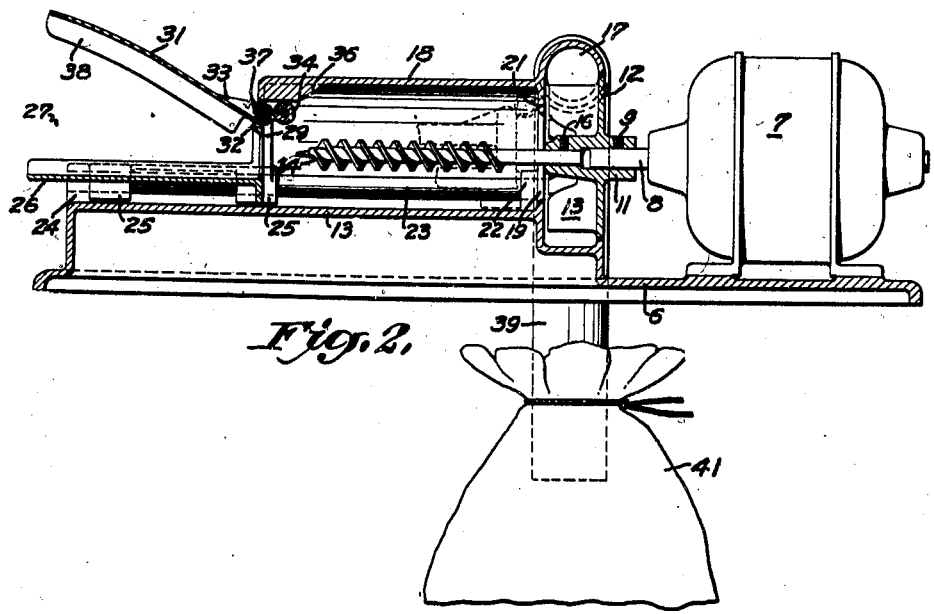
INVENTOR
JOHN R. SKOVERSKI
BY Charles S. Evans
HIS ATTORNEY Patented Feb. 25, 1930

1,748,249

UNITED STATES PATENT OFFICE

JOHN R. SKOVERSKI, OF BERKELEY, CALIFORNIA, ASSIGNOR OF ONE-HALF TO GEORGE H. ROBERTS AND ONE-HALF TO JOSEPH SCHOR, OF SAN FRANCISCO, CALIFORNIA

BORING MACHINE

Application filed June 18, 1928. Serial No. 286,374.

My invention relates to machines for boring or hollowing objects, and particularly to machines for boring bread rolls preparatory to filling them with hash or other food products.

In my co-pending application, Serial No. 276,332 filed May 9, 1928, I have disclosed a dispensing machine for filling hollowed rolls with such products quickly and cleanly. Foods of this character are customarily sold at lunch counters or places of amusement where the demand is intermittent, but where many may require service within a very short period of time. In order to satisfactorily fill this demand the foods must be fresh, hot, and appetizing. They cannot, therefore, be prepared in advance, but must be made up as required, and the process must not consume over a few seconds. The broad purpose of my invention is to provide a machine which will bore out rolls for this use, and will accomplish this in a quick, neat, and sanitary manner.

An object of my invention is to provide a roll-boring machine which will operate so rapidly as to make the time consumed in the process negligible, so that in serving large numbers of people initial preparation of the rolls is unnecessary.

Another object of my invention is to provide a machine which is attractive in appearance.

Another object of my invention is to provide a boring machine which will dispose of the bored out particles, chips, or crumbs without scattering or waste.

Another object of my invention is to provide a boring machine which is portable and self contained, and may be operated from the ordinary house-lighting circuit.

Still another object of my invention is to provide a boring machine which will automatically seize and hold the object to be bored and release it when the operation is complete.

A further object of my invention is to provide a machine in which the boring tool is fully housed to prevent accidental contacts and injury to the operator.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Figure 1 is a plan view of a machine embodying my invention.

Figure 2 is a vertical sectional view of the machine, the plane of section being indicated by the line 2—2 of Figure 1. Dotted lines indicate the position of the parts when the carriage of the machine is advanced.

Broadly considered my invention comprises means for holding and rotating a boring tool, and a movably mounted carriage for advancing the object to be bored against the tool. On the carriage is a clamp for holding the object, and the parts are so arranged that advancing the carriage actuates the clamp to hold the object, and retraction of the carriage releases the clamp. A housing is preferably provided for the tool, and means for removing the particles of bored out material from the housing.

A preferred embodiment of my invention comprises a preferably cast base 6 to which is secured an electric motor 7. On the shaft 8 of the motor, secured by a set screw 9, is a centrifugal fan runner, comprising a hub 11, back-disk 12 and blades 13. The end of the hub serves as a chuck, in which the shank of a boring tool 14 is held by a set screw 16. A carpenter's bit forms a very satisfactory boring tool.

Preferably cast integrally with the base are a volute 17 for the fan and a housing 18 which completely covers the bit. The latter projects thru a central opening 19 in a septum 21 which divides the fan housing or volute from the bit housing, the opening 19 acting as the intake port for the fan. The lower part of the septum is provided with a pair of bosses 22 which support rods 23 extending thru and projecting from the housing parallel to the axis of the bit. The outer ends of the rods are held in brackets 24 rising from the base 6.

The rods form a slideway on which a carriage runs on bearings formed in lugs 25 projecting beneath a platform or support 26 for the roll 27 which is to be bored. To one of the outer lugs a handle 28 for moving the carriage is secured.

Spanning the inner end of the carriage is an arched bracket 29 to which a cover or clamp 31 for holding the roll is hinged, the hinge pin 32 passing thru a pair of bracket arms 33 which rise obliquely from the inner end of the clamp. The arms extend beyond the hinge pin to carry a roller 34 which engages a cam 36, formed within the top of the housing, to raise the clamp when the carriage is retracted from the housing. When the carriage is advanced into the housing the cam disengages and a spring 37 forces the clamp down to hold the roll securely. Flanges 38 extend downwardly from the clamp to prevent the roll from moving laterally.

The bit is driven at high speed and since the material of the roll is soft the boring operation is almost instantaneous. The bored out material is removed from the housing by the suction of the fan, and passes thru a hose or pipe 39 secured to the outlet port into a bag or other suitable container 41.

The entire time required for placing, boring and removing the roll is but 3 or 4 seconds, so that many persons may be served by a single machine within a very short interval.

It is obvious that the construction described can be greatly modified if desired, punched parts being substituted for castings, etc. However, it is to be noted that the described construction comprises essentially but four castings, i. e., the base, fan runner, carriage and clamp, and that these parts require a minimum of machine work. The rounded corners of the castings offer no opportunity for the collection of dirt; and if aluminum be used as the material a machine of pleasing appearance is produced without the necessity for enamel or other surface finish. The machine looks clean and this is an important factor in a device whose operation is observed by those who are to eat its product.

I claim:

1. A boring machine comprising means for holding and rotating a bit, a housing for said bit, a carriage for advancing the object to be bored into said bit, a clamp on said carriage for holding said object, and a cam within said housing for releasing said clamp when the carriage is retracted.

2. A boring machine comprising means for holding and rotating a bit, a housing for said bit, a slideway parallel to the rotational axis of said bit, a carriage on said slideway, a spring operated cover on said carriage forming a clamp for holding the object to be bored, means for retracting and for advancing said carriage on said slideway, and a cam for raising said cover to release the object when the carriage is retracted.

3. A boring machine comprising means for holding and rotating a bit, a housing for said bit, a slideway parallel to the rotational axis of said bit, a carriage on said slideway, a spring operated cover on said carriage forming a clamp for holding the object to be bored, means for retracting and for advancing said carriage on said slideway, and a cam within said housing for raising said cover to release the object when the carriage is retracted.

4. A boring machine comprising means for holding and rotating a bit, a housing for said bit, a holder for positioning the object to be bored with respect to said bit, said bit and holder being relatively movable to bring the bit and object into engagement, a clamp on said holder for securing the object thereto, and a cam within the housing for releasing said clamp when the object and bit are moved out of engagement.

In testimony whereof, I have hereunto set my hand.

JOHN R. SKOVERSKI.